United States Patent
Yamaguchi et al.

(10) Patent No.: US 6,185,038 B1
(45) Date of Patent: Feb. 6, 2001

(54) REAR PROJECTION SCREEN WITH LIGHT DIFFUSION SHEET AND PROJECTOR USING SAME

(75) Inventors: Hiroshi Yamaguchi; Kenichi Ikeda, both of Osaka (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/148,960

(22) Filed: Sep. 8, 1998

(30) Foreign Application Priority Data

Sep. 26, 1997 (JP) .................................................. 9-261679

(51) Int. Cl.$^7$ ............................. G03B 21/60; G03B 21/56
(52) U.S. Cl. ............................................. 359/457; 359/460
(58) Field of Search .................................. 359/443, 450, 359/455, 456, 457, 460, 453, 452; 353/74, 75, 97

(56) References Cited

U.S. PATENT DOCUMENTS

| Re. 33,795 | * | 1/1992 | Ogino | 353/74 |
|---|---|---|---|---|
| 1,791,573 | * | 2/1931 | Parolini | 359/450 |
| 2,388,203 | * | 10/1945 | Zindel, Jr. | 250/164 |
| 3,511,563 | * | 5/1970 | Erwin | 353/38 |
| 4,066,332 | * | 1/1978 | Kato et al. | 350/126 |
| 4,083,626 | * | 4/1978 | Miyahara et al. | 350/117 |
| 4,184,762 | * | 1/1980 | Guzman | 355/1 |
| 4,566,756 | * | 1/1986 | Heijnemans | 350/126 |
| 4,923,280 | * | 5/1990 | Clausen et al. | 350/128 |
| 5,543,870 |   | 8/1996 | Blanchard | 353/74 |
| 5,615,045 | * | 3/1997 | Takuma et al. | 359/456 |
| 5,781,344 | * | 7/1998 | Vance | 359/614 |

FOREIGN PATENT DOCUMENTS

| 57-153334 | 3/1981 | (JP) . |
|---|---|---|
| 6-82607 | 3/1994 | (JP) . |

* cited by examiner

Primary Examiner—Russell Adams
Assistant Examiner—Christopher Mahoney
(74) Attorney, Agent, or Firm—Merchant & Gould P.C.

(57) ABSTRACT

In a screen for a rear image projection system, a Fresnel lens sheet, a lenticular lens array sheet whose longitudinal direction is arranged in the vertical direction, and a light diffusion sheet are provided in that order from the projection side. The light diffusion sheet has louver-shaped light absorption wall columns whose longitudinal direction is arranged in the horizontal direction and a light diffusion layer. The light diffusion layer is located on the observation side of the light absorption wall columns. Projected light is properly dispersed and exits without causing the absorption loss due to the light absorption wall columns. Outside light entering from the observation side is diffused in the light diffusion layer and absorbed by the light absorption wall columns. Also, the total reflection component on the lenticular lens surface is absorbed by the light absorption wall columns. As a result, the decrease of contrast caused by the diffuse reflection can be reduced greatly. Therefore, a rear projection screen and a rear projector that have a great effect of reducing the reflection of the outside light with a small loss of the transmitted light can be obtained.

4 Claims, 10 Drawing Sheets

REAR PROJECTION SCREEN WITH LIGHT DIFFUSION SHEET AND PROJECTOR USING SAME

FIELD OF THE INVENTION

The present invention relates to a rear projection screen and a rear projector provided with the same.

BACKGROUND OF THE INVENTION

Recently, the need for a large screen image display has been increased mainly for a TV receiver. A rear projector (a rear projection type image display unit) that can realize this with a relatively light weight and a small size has been drawing attention.

The most common rear projector uses red, green and blue monochrome image CRTs as the image sources, enlarges and projects the images on the CRTs with the corresponding three projection lenses, superimposes the images on the screen, and displays the images as a color image. The basic structure of this rear projector is schematically shown in FIG. 8.

In FIG. 8, 1 denotes a CRT, 2 denotes a projection lens, and R, G and B correspond to red, green and blue monochrome images respectively. Three primary color images formed on the CRTs 1 are enlarged and projected by the projection lenses 2, and superimposed on a screen 3.

The screen 3 distributes the projected light properly so that the projected light can be perceived as an image from various angles.

The screen 3 generally comprises a Fresnel lens sheet 4 and a lenticular lens array sheet 5. The Fresnel lens sheet 4 converges the projected light entering divergently from the center to the periphery of the screen and converts the projected light to a substantially parallel light. The lenticular lens array sheet 5 diffuses the projected light converted to the substantially parallel light so that the projected light can be perceived as an image from various angles.

The use of the lenticular lens array sheet as a means for diffusing the projected light instead of a simple diffusion sheet can implement the following effective functions.

The first function is providing anisotropic diffusion. The anisotropic diffusion makes it possible to effectively distribute a limited light and increase the luminance in the effective observation region. In an image display unit, it is generally required that bright good images be perceived from a wide angle range in the horizontal direction. On the other hand, good images should be perceivable in a range from the standing position to the sitting position in the vertical direction. It is said that when the effective observation region is expressed by an angle at which the luminance is reduced to a half of the front luminance (a half-luminance angle), the half-luminance angle should be about ±30° in the horizontal direction and about ±10° in the vertical direction. With isotropic diffusion, when the half-luminance angle in the horizontal direction is 30°, the half-luminance angle in the vertical direction is naturally 30°. Therefore, the front luminance is 1/3compared with the case of the anisotropic diffusion.

The anisotropic diffusion is generally provided by adding a diffusion material inside the lenticular lens array sheet 5 so as to provide a relatively wide angle of view due to a synergetic effect of the action of the lenticular lens and the diffusion material in the horizontal direction and provide a relatively narrow angle of view due to the action of the diffusion material in the vertical direction to which the action of the lenticular lens does not contribute.

The second function is diffusing red, green and blue lights entering at different angles respectively with substantially the same light distribution characteristics. A phenomenon in which red, green and blue light ray groups have different directivities (light distribution characteristics) respectively due to different incidence angles is called color shift. Making the light distribution characteristics of each light ray group the same is called a color shift correction function. For the color shift correction function, a pair of lenticular lenses are provided on the entrance side and the exit side. The action of the lenticular lenses will be described with reference to FIG. 9.

FIG. 9 shows a cross-sectional view of an example of a pair of lenticular lens arrays that are designed to correct the color shift. The entrance surface and the exit surface are expressed by the following function wherein the x axis is the optical axis (the horizontal direction in FIG. 9) and the y axis is the direction perpendicular to the optical axis (the vertical direction in FIG. 9).

Entrance surface $$x = -(1 - y^2/b^2)^{1/2} + C*y^2 \quad (|y| < 0.66)$$
$$b^2 = 0.556$$
$$C = 0.125$$

Exit surface $$x = 0.62 \quad (|y| < 0.085)$$
$$x = D + A_1*y + A_2*y^2 + A_3*y^3 + A_4*y^4 \quad (0.085 < |y| < 0.33)$$
$$D = 0.5872$$
$$A_1 = 0.8528$$
$$A_2 = -6.575$$
$$A_3 = 13.94$$
$$A_4 = -14.80$$

In FIG. 9, for the light rays having light ray heights of 0 and ±0.53, the track of the light ray entering parallel to the optical axis (the green light ray) is indicated by the solid line, and the track of the light ray entering at 15° with respect to the optical axis (the red or blue light ray) is indicated by the broken line.

As is apparent from FIG. 9, the lenticular lens 5b on the exit side corrects in such a manner that the light ray entering obliquely with respect to the optical axis exits at an angle substantially equal to that of the light ray entering parallel to the optical axis at the same light ray height. Thus, color change depending on the observation angle is prevented by making the diffusion profiles of the red and blue parallel light ray groups entering obliquely with respect to the optical axis substantially the same as the diffusion profile of the green light ray group entering parallel to the optical axis.

The third function is reducing the decrease of contrast due to the reflection of the outside light. As is apparent from FIG. 9, the light ray passage region on the exit surface is limited by the light gathering action of the lenticular lens 5a on the entrance side. Black stripes (light absorption layers) 6 are formed in the non-exit regions of the exit surface. A general method for forming the black stripes 6 comprises providing trapezoidal convex portions corresponding to the non-exit regions in forming the exit side lenticular lenses 5b and providing black stripes only in the convex portions by screen printing or transfer with a black ink, utilizing the unevenness. The black stripe 6 absorbs the outside light and reduces the decrease of contrast.

The reflection of the outside light without the black stripes is shown in FIG. 10. Without the black stripes, the light enters from the non-exit regions on the exit side as well. As a result, as shown in FIG. 10, 20 to 30% of the outside light entering from the exit surface is subjected to the total reflection of the surface of the entrance side lenticular lens 5a and exits to the observation side. With the black stripes, such a total reflection component can be blocked substantially completely.

Thus, the total reflection component on the surface of the entrance side lenticular lens can be reduced greatly by the black stripes. However, the unevenness is present on the exit surface because of the exit side lenticular lenses and the convex portions for forming the black stripes, and the unevenness causes the diffuse reflection of the outside light, thereby decreasing the contrast.

In order to reduce such diffuse reflection caused by the unevenness of the exit surface of the lenticular lens array sheet, a light transmission sheet containing a light absorption agent, that is, a tinted panel, is generally located on the observation side of the lenticular lens array sheet. If the tinted panel is present, the projected light passes through the tinted panel once (one passage), while the reflected component of the outside light reciprocates through the tinted panel (two passages). Therefore, the contrast can be relatively improved.

Furthermore, when a liquid crystal panel is used as the image source, the color shift correction function is unnecessary, and the exit side lenticular lenses are unnecessary. Therefore, the exit surface can be made flat to prevent the diffuse reflection due to the unevenness. However, when the liquid crystal panel is used as the image source, the reduction of the reflection of the lenticular lens array sheet is important in view of another factor.

When a liquid crystal panel is used as the image source, moiré due to the interference of the periodic structure of the pixels and that of the lenticular lenses causes a problem. In order to avoid the moiré problem, the pitch of the lenticular lenses should be sufficiently smaller than that of the pixels on the screen. Therefore, a lenticular lens array sheet having a finer pitch than the case of using CRTs as the image sources is required. It is difficult to form the black stripes in exact positions corresponding to the lenticular lenses as the pitch is finer.

Without the black stripes, a part of the outside light entering the lenticular lens array sheet is subjected to the total reflection due to the above-described mechanism, thereby deteriorating the contrast greatly.

In order to reduce such a contrast decrease due to the reflection of the surface of the entrance side lenticular lens, a light absorption agent is generally dispersed inside the lenticular lens array sheet.

As another method for reducing the effect on the outside light, a technology using "a blocking means" for transmitting light at a specific angle and blocking light at other angles is disclosed in Japanese Patent Application (Tokkai) Hei) No. 7-056109. In this Japanese Patent Application, the above-described blocking means is located between the lenticular lens array sheet (simply referred to as "a screen" in the cited specification) on the observation side and the Fresnel lens sheet (referred to as "an aiming means" in the cited specification) on the projection side. According to such a means, the outside light entering the Fresnel lens sheet can be reduced significantly to prevent the contrast decrease caused by the reflection of the Fresnel lens sheet.

When the tinted panel is present or the light absorption agent is dispersed inside the lenticular lens array sheet as described above, the contrast certainly increases, but the loss of the projected light occurs. Furthermore, the efficiency for light utilization decreases greatly when trying to improve the contrast greatly.

The technology disclosed in Japanese Patent Application (Tokkai Hei) No. 7-056109 is effective for preventing the decrease of contrast caused by the entrance of the outside light into the Fresnel lens sheet and the reflection of the outside light inside the Fresnel lens sheet and the device. However, this technology does not have any effect of reducing the reflection of the outside light occurring in the lenticular lens array sheet as described above.

SUMMARY OF THE INVENTION

It is an object of the present invention to provide a rear projection screen that can effectively reduce the reflection of the outside light in the lenticular lens array sheet without greatly decreasing the efficiency for light utilization and have a small decrease in contrast even in a bright environment. It is another object of the present invention to provide a rear projector that has a high efficiency for light utilization and can display images with an excellent contrast even in a bright environment.

In order to solve the above problems, in the present invention, light absorption wall columns (light blocking wall columns) are formed to transmit the projected light refracted by the lenticular lens, so that the projected light diffuses after passing through the light absorption wall columns.

According to the present invention, the reflection of the outside light can be reduced greatly while minimizing the loss of the projected light. Therefore, a rear projection screen and a rear projector that are excellent in contrast and have a good efficiency for light utilization can be provided.

A rear projection screen according to a first aspect of the present invention comprises, in the following order from the projection side, a Fresnel lens sheet, a lenticular lens array sheet whose longitudinal direction is arranged in the vertical direction, and a light diffusion sheet. The light diffusion sheet has louver-shaped light absorption wall columns whose longitudinal direction is arranged in the horizontal direction and a light diffusion layer. The light diffusion layer is located on the observation side of the light absorption wall columns. According to the first aspect, the projected light is not affected in the vertical direction by the action of the lenticular lens. Therefore, the projected light having a sharp directivity is hardly lost by the light absorption wall columns. On the other hand, the light absorption wall columns effectively absorb the outside light and reduce the reflection of the outside light. Therefore, a rear projection screen that has a high efficiency for light utilization and has a small decrease in contrast even in a bright environment can be provided.

A rear projection screen according to a second aspect of the present invention comprises, in the following order from the projection side, a Fresnel lens sheet, and a lenticular lens array sheet having a lenticular lens array whose longitudinal direction is arranged in the vertical direction on the projection side, that is, the entrance side. The lenticular lens array sheet has louver-shaped light absorption wall columns whose longitudinal direction is arranged in the horizontal direction and a light diffusion layer. The light diffusion layer is located on the observation side of the light absorption wall columns. According to the second aspect, the projected light is not refracted in the vertical direction by the entrance side lenticular lens. Therefore, the projected light having a sharp directivity is hardly lost by the light absorption wall columns. On the other hand, the light absorption wall columns effectively absorb the outside light and reduce the reflection of the outside light. Therefore, a rear projection screen that has a high efficiency for light utilization and has a small decrease in contrast even in a bright environment can be provided.

A rear projection screen according to a third aspect of the present invention comprises, in the following order from the projection side, a Fresnel lens sheet, and a lenticular lens array sheet having a lenticular lens array whose longitudinal direction is arranged in the vertical direction on the projection side, that is, the entrance side. The lenticular lens array sheet has light absorption wall columns whose longitudinal direction is arranged in the vertical direction, the light absorption wall columns being arranged substantially parallel to the light ray paths of projected light. According to the third aspect, the light absorption wall columns can effectively absorb the component of the outside light reflected by the surface of the entrance side lenticular lens, especially the total reflection light, with little or no loss of the projection light. Therefore, a rear projection screen that has a high efficiency for light utilization and has a small decrease in contrast even in a bright environment can be provided.

A rear projector according to the present invention comprises the rear projection screen according to any one of the first to third aspects. According to this aspect, it is possible to display images with a high efficiency for light utilization and with an excellent contrast even in a bright environment.

DETAILED DESCRIPTION OF THE INVENTION

Preferred embodiments of the present invention will be described below with reference to the drawings.

First Embodiment

Figure 1:
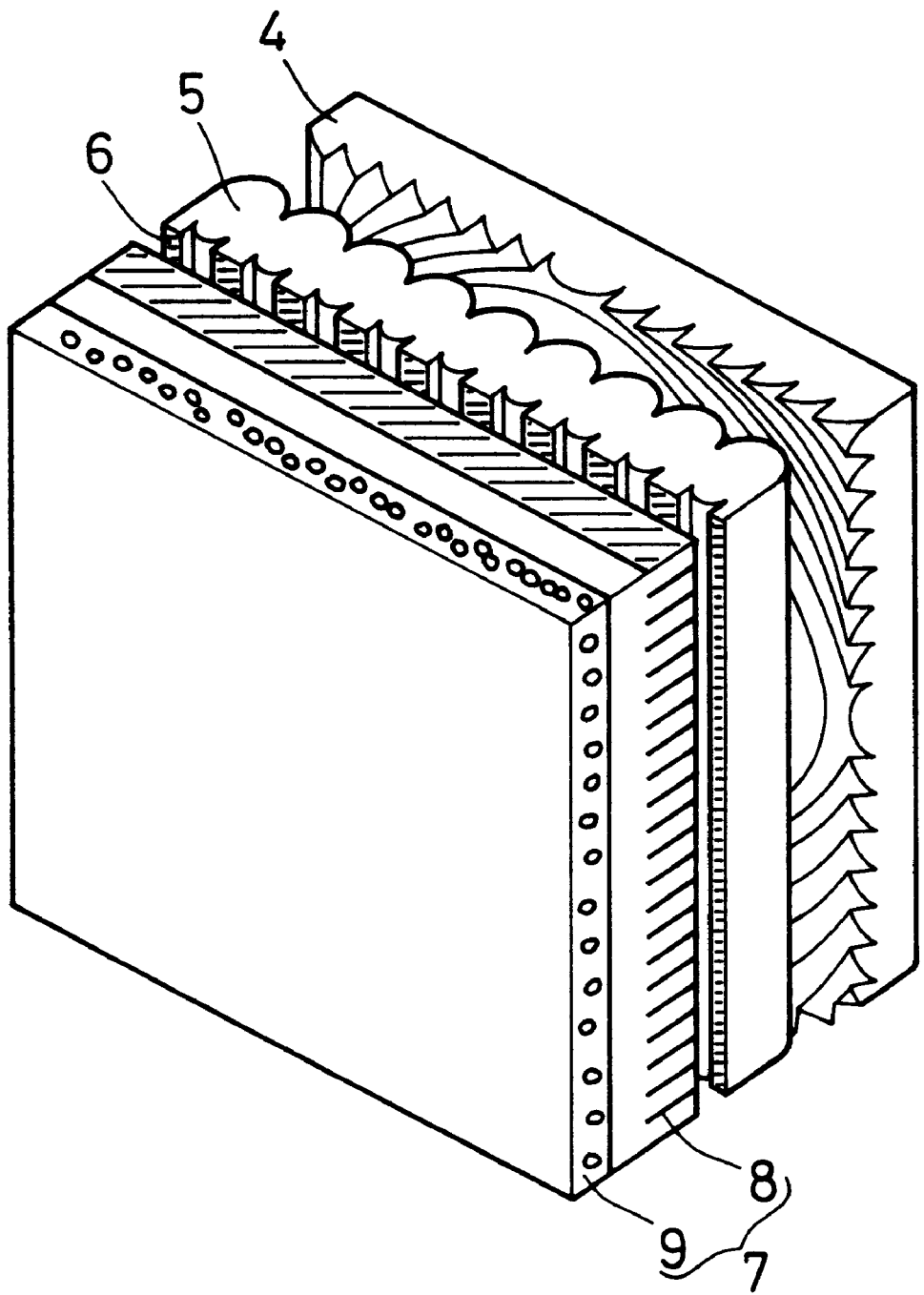
FIG. 1 is a schematic perspective view of a rear projection screen in a first embodiment of the present invention.

FIG. 1 is a perspective view schematically showing an embodiment of the rear projection screen according to the first aspect.

A Fresnel lens sheet 4, a lenticular lens array sheet 5, and a diffusion sheet 7 are located in this order from the projection side to the observation side (the exit side). A lenticular lens array whose longitudinal direction is arranged in the vertical direction is formed on the projection side surface and the exit side surface of the lenticular lens array sheet 5. In FIG. 1, the elements are schematically shown to be easily seen. The array pitch of the actual Fresnel lens sheet and lenticular lens array sheet is about 0.1 mm and about 0.7 mm respectively. In a 40-inch screen, 1,000 or more of lenticular lenses are arranged. Black stripes 6 are formed on the exit side of the lenticular lens array sheet 5 in regions where the lenticular lenses are not formed.

Projected light enters the lenticular lens array sheet 5 as a substantially parallel light due to the action of the Fresnel lens 4. The lenticular lens array sheet 5 does not contain a diffusion material and is transparent. The lens array sheet 5 provides diffusion in the horizontal direction and the above-described color shift correction and does not have any refraction or diffusion action in the vertical direction.

The projected light diffused in the horizontal direction enters the diffusion sheet 7. Louver-shaped light absorption wall columns 8 whose longitudinal direction is arranged in the horizontal direction are provided on the entrance side of the diffusion sheet 7 at predetermined intervals. Since the projected light is not diffused in the vertical direction at this stage, the projected light is hardly absorbed by the light absorption wall columns 8 and transmitted to a light diffusion layer 9 on the exit side. The light diffusion layer 9 provides isotropic diffusion to the projected light. Therefore, the light diffusion layer 9 diffuses the projected light in the vertical direction to secure visible regions, and smoothes a sharp light distribution due to the action of the lenticular lens in the horizontal direction to diffuse the light into regions that are not affected by the action of the lenticular lens.

Most of the outside light mainly comprising ceiling illumination is absorbed by the light absorption wall columns 8 after entering the light diffusion layer 9, so that a component that is reflected by the back surface of the diffusion sheet 7 and returned to the observation side is hardly produced. Also, a very small amount of the outside light component reaches the lenticular lens array sheet 5. However, in order that the outside light component exit to the observation side, it is necessary that the outside light component is reflected by the lenticular lens array sheet 5 (several %) and passed through the light absorption wall columns 8 again. Thus, the amount of the outside light component exiting to the observation side decreases to a negligible level.

On the other hand, the component of the outside light that is reflected by the surface of the diffusion sheet 7 (about 4% by an acrylic resin substrate) is not attenuated by the light absorption wall columns 8. However, due to regular reflection, the outside light mainly comprising the ceiling illumination is reflected downward and does not reach the field of view. Also, the regular reflection of the outside light by the surface of the diffusion sheet 7 can be reduced to a reflectance of 1% or less by a general antireflection treatment.

Here, two points should be noted. The first point is that the diffuse reflection component of the reflected outside light (here, it means light rays that enter inside from the observation side surface of the screen, diffuse inside, and exit from the observation side surface of the screen) causes that the whole screen stands out in a whitish color due to the outside light, and that a clear distinction between brightness and darkness is impaired because the black level for display increases, so that the contrast deteriorates. The regular reflection of a mirror surface causes "the projection of the reflected light onto the screen", thereby damaging images. However, it can be eliminated relatively easily by the already established antireflection technology.

The lenticular lens array sheet, which is the main transmission diffusion element with respect to the projected light, is the main factor of the diffuse reflection with respect to the outside light as described above. A conventional structure in which "a blocking means" is provided on the projection side of the lenticular lens array sheet, which is the main factor of diffuse reflection (Japanese Patent Application (Tokkai Hei) No. 7-56109), is not very effective for reducing the amount of the diffuse reflection component. The light absorption wall columns of the present invention are similar to "the blocking means" in the conventional structure in the respect that the direct action of the light absorption wall transmits light going along the light absorption wall and blocks light forming a large angle with the light absorption wall. However, in the conventional structure, since the blocking means is provided in the portion where the projected light is not diffused, the blocking means is not effective against the diffuse reflection of the outside light by the diffusion portion (the lenticular lens array sheet). On the other hand, in the present invention, since the light absorption wall columns are provided on the observation side of the main diffusion means, that is, the lenticular lens array sheet, the amount of the diffuse reflection component provided by the lenticular lens array sheet can be reduced greatly. Furthermore, the elements are located so as not to lose the projected light by paying attention to the fact that the diffusion action of the lenticular lens array sheet does not act in the vertical direction.

In the present invention, the fact that the diffusion element, that is, the light diffusion layer 9, is provided on the observation side of the light absorption wall columns may contradict the above description. However, the light diffusion layer 9 does not provide diffuse reflection. Here is the second point to be noted.

The second point is that the light diffusion layer in which transparent beads having a refractive index different from that of the base material are dispersed hardly causes diffuse reflection inside the light diffusion layer. Some prior art documents seem to misunderstand this point. The diffusion sheet looks whitish because the outside light is (transmitted and) diffused by the light diffusion layer, reflected by the back surface, passed through the light diffusion layer again, and returned to the observation side. Therefore, the component that is reflected inside the light diffusion layer before reaching the back surface and returned to the entrance side is negligible. The outside light is reflected by the back surface because the back surface forms an interface of the material of the substrate and a material having a very different refractive index, that is, air. This can be confirmed by the fact that when one surface of a diffusion sheet whose both surfaces are in the state of a mirror surface and in which transparent beads having a slightly different refractive index are dispersed is entirely printed with a black ink having the same refractive index as the substrate material and the other surface is observed, the other surface looks black, substantially similar to the case where a transparent sheet is printed black.

In the present invention, the light diffusion layer 9 and the light absorption wall columns 8 are optically bonded without a reflection interface. In order that the outside light component is diffusely reflected and returned to the observation side, it is necessary that the outside light component reaches the back surface of the diffusion sheet 7 and is reflected and returned with the same mechanism as that of the case where the back surface is printed black as described above. However, in the present invention, since the light absorption wall columns 8 are formed between the light diffusion layer 9 and the back surface of the diffusion sheet 7, a diffuse reflection reduction effect similar to that of the case where the light absorption wall columns are provided on the observation side of the light diffusion layer is obtained. Furthermore, since the light diffusion layer is present behind the light absorption wall columns with respect to the projected light, the loss does not increase.

According to the above structure, the amount of the diffuse reflection component decreasing the contrast can be reduced greatly with a minimum light loss. Also, the above structure is far more efficient than a conventional structure in which a tinted panel is located in front of a lenticular lens array sheet comprising a diffusion material.

While the black stripes 6 are formed on the exit side of the lenticular lens array sheet 5 in the above embodiment, the black stripes need not be provided. However, when the black stripes are formed, the component of the outside light reflected by the projection side lenticular lens of the lenticular lens array sheet 5 (see FIG. 10) can be reduced. Therefore, the amount of the diffuse reflection component can be reduced further.

Second Embodiment

When the rear projection screen in this embodiment uses a liquid crystal panel as an image source, greater effects can be obtained with a structure different from that of the first embodiment.

Figure 2:
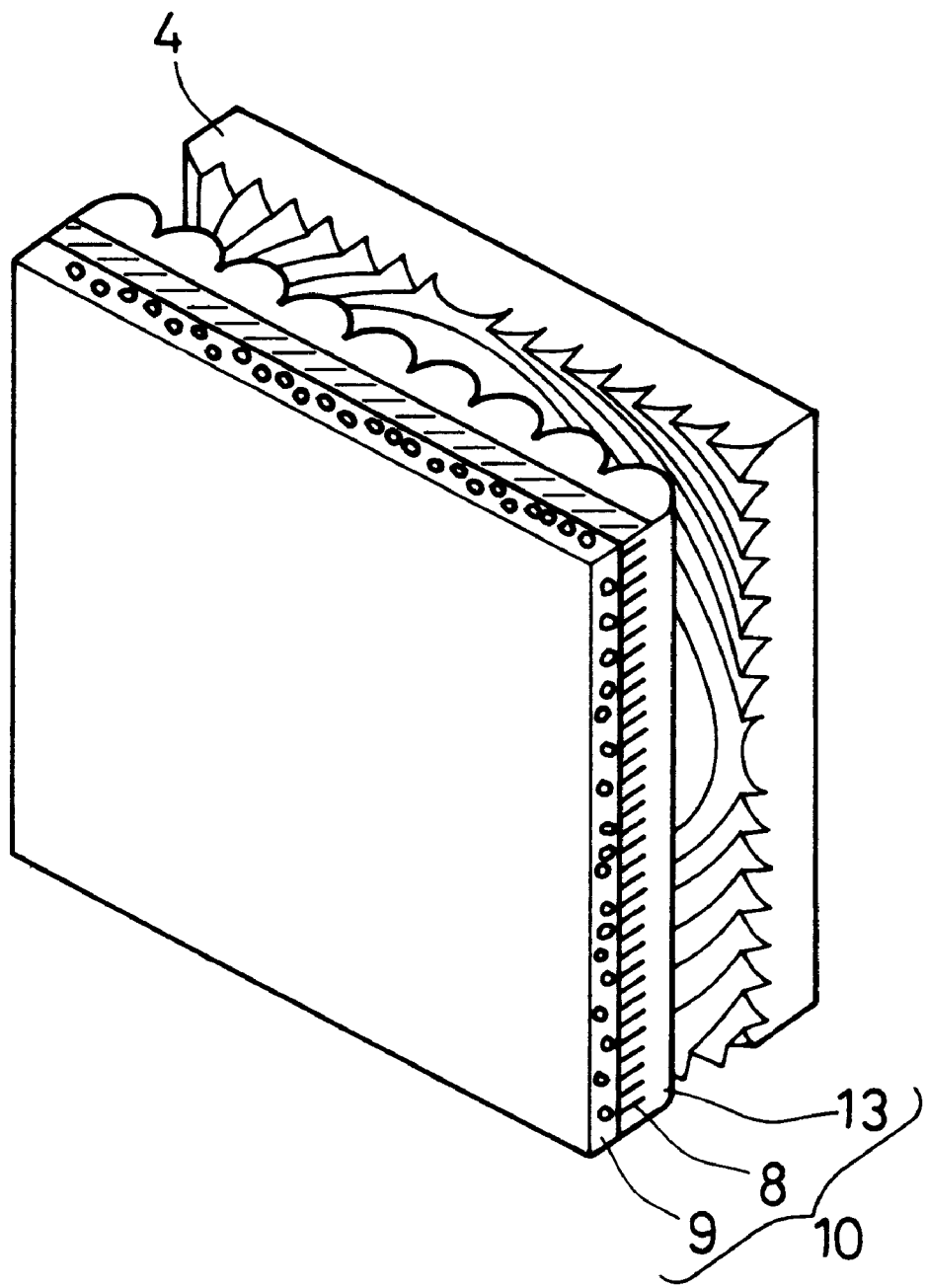
FIG. 2 is a schematic perspective view of a rear projection screen in a second embodiment of the present invention.

FIG. 2 is a perspective view schematically showing an embodiment of the rear projection screen according to the second aspect.

A Fresnel lens sheet 4 is located on the projection side and a lenticular lens array sheet 10 is located on the observation side. The lenticular lens array sheet 10 comprises a lenticular lens array 13 whose longitudinal direction is arranged in the vertical direction, louver-shaped light absorption wall columns 8 whose longitudinal direction is arranged in the horizontal direction, and a light diffusion layer 9 in this order from the projection side.

Projected light enters the lenticular lens array sheet 10 as a substantially parallel light due to the action of the Fresnel lens 4. The lenticular lens array 13, which is provided on the entrance surface, that is, the projection side, diffuses the projected light converted to the substantially parallel light in the horizontal direction and does not have any refraction or diffusion action in the vertical direction.

The projected light diffused in the horizontal direction enters the light absorption wall columns 8 whose longitudinal direction is arranged in the horizontal direction. Since the projected light is not diffused in the vertical direction at this stage, the projected light is hardly absorbed by the light absorption wall columns and transmitted to the light diffusion layer 9 on the exit side. The light diffusion layer 9 provides isotropic diffusion to the projected light. Therefore, the light diffusion layer 9 diffuses the projected light in the vertical direction to secure visible regions, and smoothes a sharp light distribution due to the action of the lenticular lens in the horizontal direction to diffuse the light into regions that are not affected by the action of the lenticular lens.

Most of the outside light mainly comprising ceiling illumination is absorbed by the light absorption wall columns 8 after entering the lenticular lens array sheet 10, so that a very small amount of the component reaches the surface of the entrance side lenticular lens. The outside light component that reaches the surface of the lenticular lens is reflected to the observation side in a relatively large proportion including total reflection. However, since a very small amount of the component reaches the surface of the lenticular lens, and the component is affected by a large absorption action when passing through the light absorption wall columns 8 again, a very small amount of the reflected component of the outside light exits to the observation side from the exit surface of the lenticular lens array sheet 10.

According to the above structure, the reflection of the outside light can be reduced sufficiently without black stripes, and the alignment of the lenticular lens array on the entrance side and the black stripe columns on the exit side, which is necessary to form black stripes, is unnecessary. Thus, a fine pitch can be obtained easily. Therefore, this structure is suitable for a projection device that comprises a liquid crystal panel as an image source and easily causes a moiré problem. Of course, if the black stripes can be formed, a greater reflection reduction effect can be expected with the use of the black stripes.

Third Embodiment

Figure 3:
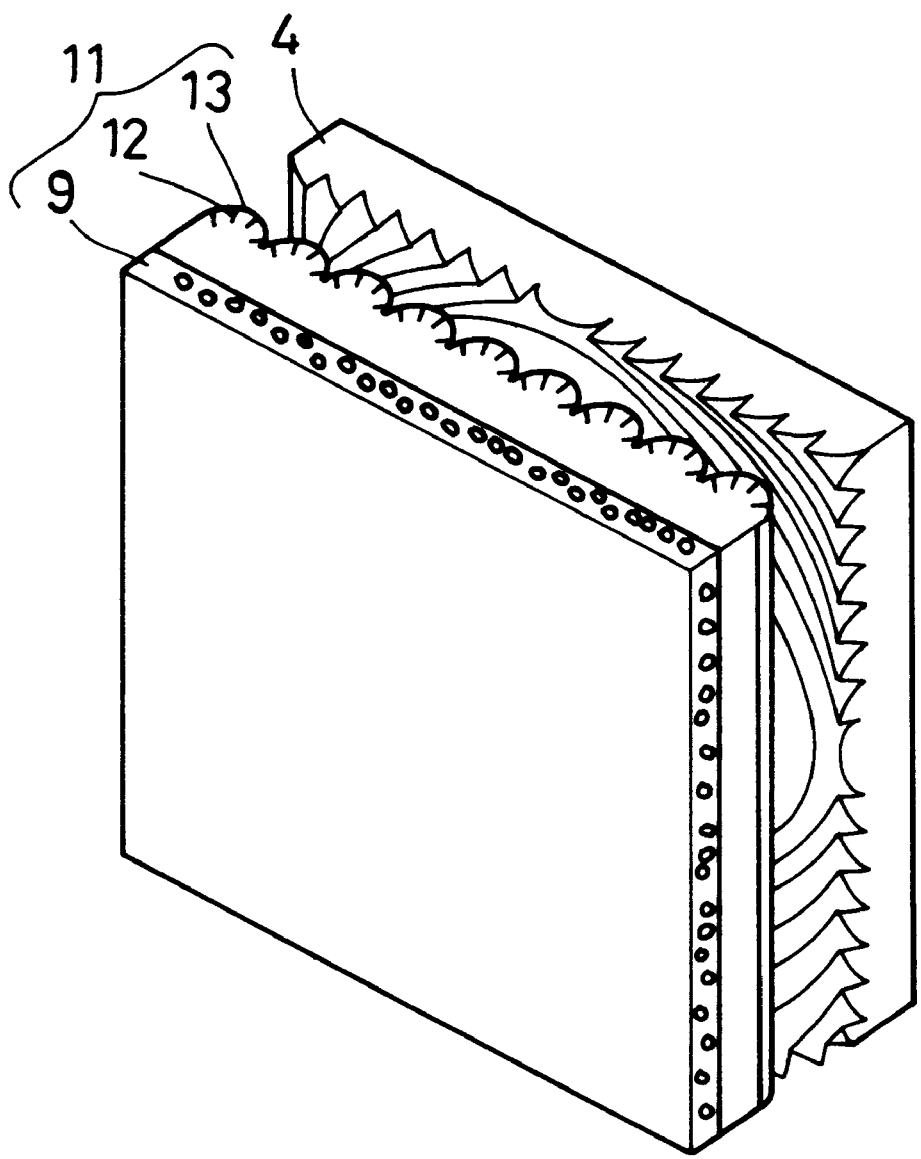
FIG. 3 is a schematic perspective view of a rear projection screen in a third embodiment of the present invention.

FIG. 3 is a perspective view schematically showing an embodiment of the rear projection screen according to the third aspect.

A Fresnel lens sheet 4 is located on the projection side and a lenticular lens array sheet 11 is located on the observation side. The lenticular lens array sheet 11 has a lenticular lens array 13 whose longitudinal direction is arranged in the vertical direction on the entrance surface, that is, the projection side. Light absorption wall columns 12 are provided in the vicinity of the entrance surface and extend into the lens array 13 in a direction substantially along (i.e. generally parallel to) the light ray paths of the projected light, with their longitudinal direction arranged in the vertical direction. A light diffusion layer 9 is located on the observation side of the light absorption wall columns 12.

Figure 4:
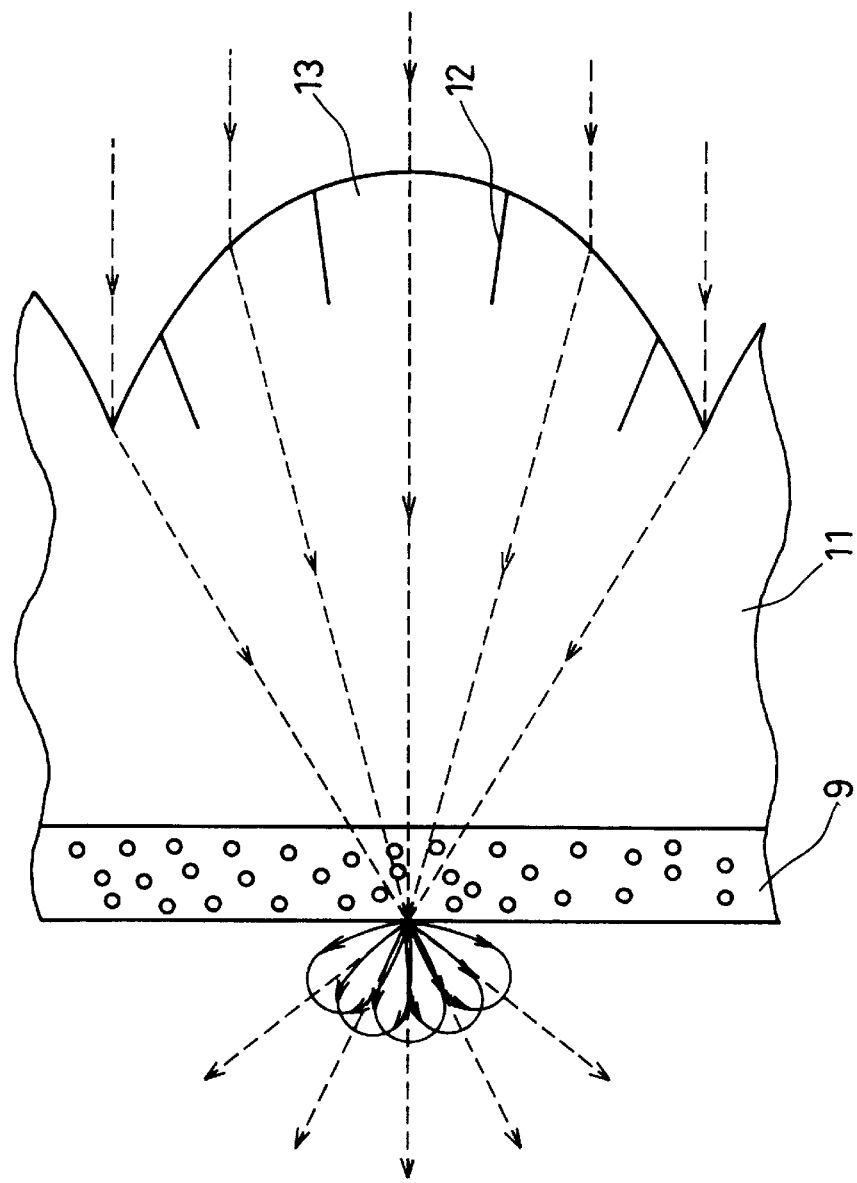
FIG. 4 is a fragmentary sectional view of the lenticular lens array sheet used in the screen in FIG. 3, explaining its function.

FIG. 4 shows a fragmentary sectional view of the lenticular lens array sheet 11 with the light ray paths of the projected light.

The projected light converted to a parallel light beam by the action of the Fresnel lens sheet 4 goes inside the lenticular lens array sheet 11 along the tracks shown by the broken lines in FIG. 4 due to the action of the lenticular lens. Since the light absorption wall columns 12 extend in a direction along the light ray paths, the projected light is hardly absorbed by the light absorption wall columns 12 and reaches the light diffusion layer 9.

The light diffusion layer 9 provides isotropic diffusion to the projected light. Therefore, the light diffusion layer 9 diffuses the projected light in the vertical direction to secure visible regions, and smoothes a sharp light distribution due to the action of the lenticular lens in the horizontal direction to diffuse the light into regions that are not affected by the action of the lenticular lens.

Figure 10:
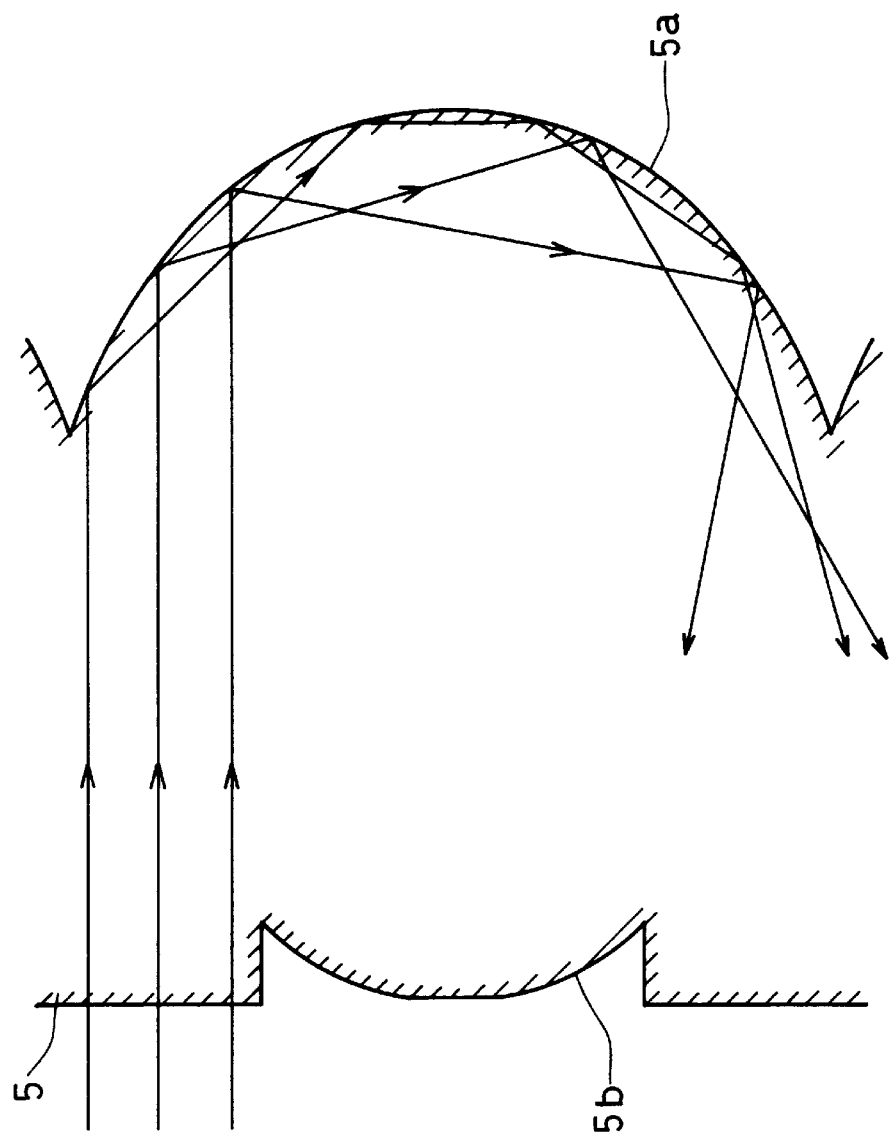
FIG. 10 is a fragmentary sectional view of a lenticular lens sheet without black stripes, explaining the reflection of outside light by the lenticular lens surface.

Among the outside light entering the lenticular lens array sheet 11, the total reflection light that deteriorates the contrast as the main component of reflection is mostly transmitted in the vicinity of the surface of the lenticular lens as shown in FIG. 10. Therefore, by forming the light absorption wall columns 12 in the vicinity of the surface of the lenticular lens as shown in FIG. 4, all of the total reflection light is absorbed by the light absorption wall columns 12 and is not returned to the observation side as the reflected light.

In FIGS. 3 and 4, the light diffusion layer 9 is provided in the vicinity of the focal point of the lenticular lens 13. The efficiency for the utilization of the projected light and the reflection reduction effect are not affected by locating the light diffusion layer 9 in any portion on the observation side of the light absorption wall columns 12. However, if the light diffusion layer 9 is formed at a very great distance from the focal point, the resolving power deteriorates. The light diffusion layer 9 is preferably located on the observation side of the light absorption wall columns 12 in a position where the distance from the lenticular lens surface is within twice the focal length of the lenticular lens 13.

In addition, it is possible to secure the field of view in the vertical direction without the light diffusion layer 9 by providing an element that diffuses light only in the vertical direction on the projection side of the lenticular lens array sheet 11.

For example, it is considered that a relatively shallow lenticular lens array whose longitudinal direction is arranged in the horizontal direction is provided on the projection side surface of the Fresnel lens sheet, which is usually flat. Diffusion only in the vertical direction does not increase the absorption loss by the light absorption wall columns 12 provided in the lenticular lens array sheet 11.

In this case, however, diffusion is provided in the vertical and horizontal directions only by the refraction action of the lenticular lens. Therefore, sharp light distribution characteristics are provided in which light hardly exits at an angle equal to or greater than a specific angle determined by the shape of the lenticular lens.

The isotropic diffusion provided by the light diffusion layer 9 smoothes such sharp characteristics and reduces the moiré problem, so that the effect of reducing the impression of glittering is expected to be obtained. Therefore, it is preferable to provide at least a minimum isotropic diffusion by the light diffusion layer. In particular, in order to obtain a large angle of view in the vertical direction, the use of the lenticular lens array whose longitudinal direction is arranged in the horizontal direction and the diffusion layer is effective.

Also, while four light absorption wall columns 12 are provided for one lenticular lens surface in FIG. 4, the present invention is not limited to this. As is apparent from FIG. 10, in order to absorb the total reflection component, one light absorption wall column provided in the vicinity of the vertex of the lenticular lens is sufficient, or one light absorption wall column provided in the vicinity of each of both edges of the lenticular lens is sufficient. Furthermore, the location of the light absorption wall columns with respect to each lenticular lens need not be the same in all the lenticular lenses of the lenticular lens array. Therefore, the array pitch of the light absorption wall columns should be 1/1.5 or less of that of the lenticular lenses.

The height of the light absorption wall should be about $1/10$ to $1/5$ of the array pitch of the lenticular lenses as seen from FIG. 10. If the height is too high, the absorption loss of the projected light is easily caused by various error factors.

In addition, the light absorption wall columns are preferably formed parallel to the light ray paths of the projected light. The light absorption wall columns can be formed substantially along the light ray paths, if not parallel to the light ray paths. For example, even if the light absorption wall columns are formed in the normal line direction of the lenticular lens surface, a sufficient reflection reduction effect is obtained. In this case, the loss of the projected light slightly increases. However, the reflection of the outside light can be reduced far more efficiently than dispersing a light absorption agent throughout the lenticular lens array sheet.

Furthermore, if the light absorption wall columns 8 whose longitudinal direction is arranged in the horizontal direction as shown in FIG. 2 is further provided, a greater effect of reducing the reflection of the outside light is obtained.

According to the above structure, the reflection of the outside light can be reduced sufficiently without black stripes, and the alignment of the lenticular lens array on the entrance side and the black stripe columns on the exit side, which is necessary to form black stripes, is unnecessary. Thus, a fine pitch can be obtained easily. Therefore, this structure is suitable for a projection device that comprises a liquid crystal panel as an image source and easily causes a moiré problem.

Fourth Embodiment

Figure 5:
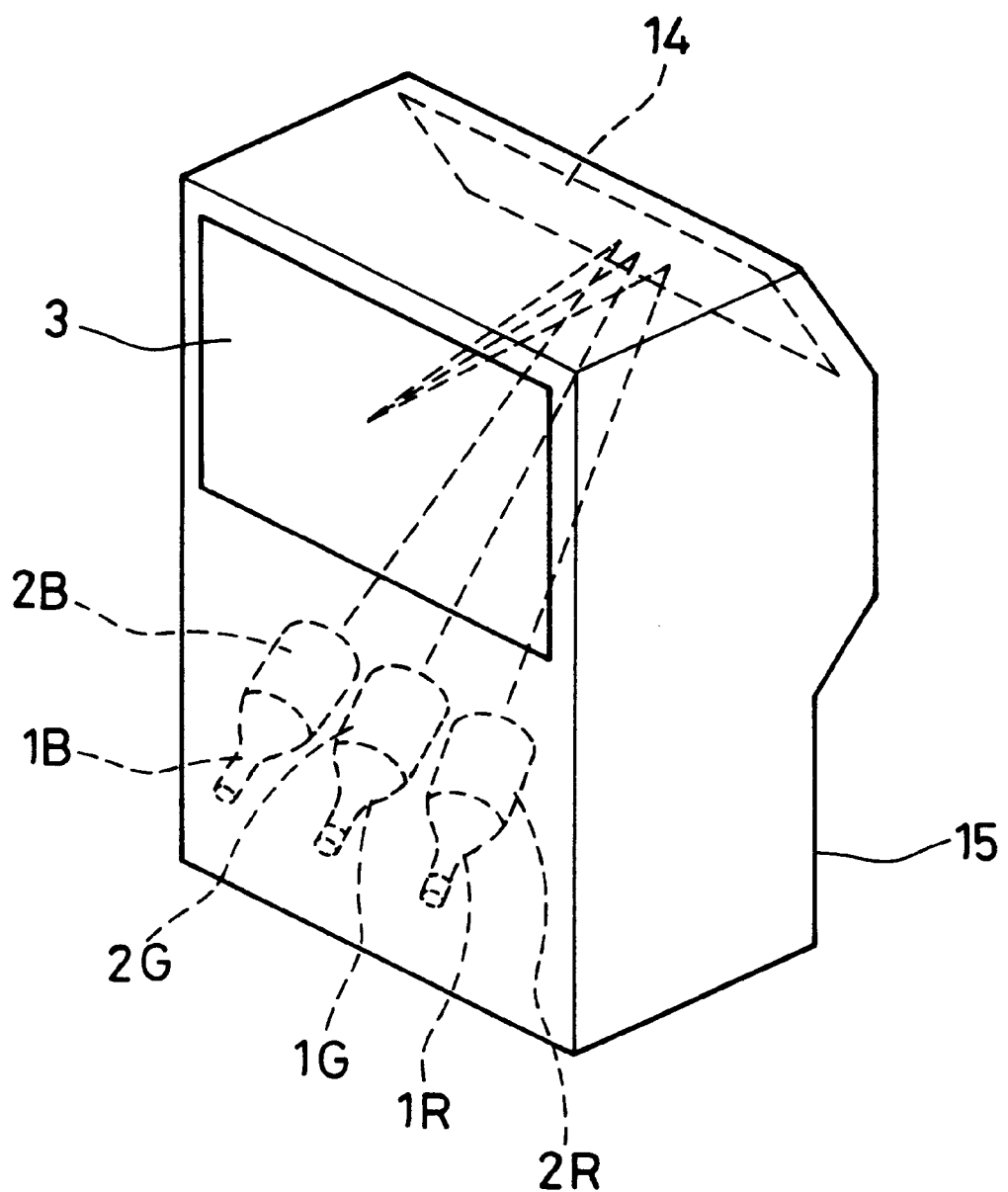
FIG. 5 is a schematic perspective view of a rear projector in a fourth embodiment of the present invention.

FIG. 5 is a perspective view of an embodiment of the rear projector of the present invention, showing the location of its main elements.

In FIG. 5, 1 denotes a CRT, 2 denotes a projection lens, and R, G and B correspond to red, green and blue monochrome images respectively. The monochrome images formed on the CRTs 1 are enlarged and projected by the projection lenses 2, reflected by a mirror 14, and superimposed on a screen 3 provided in the position for image formation. The screen of the first embodiment is used as the screen 3.

First, a general rear projector will be described below, and then a rear projector specific to the present invention will be described.

As described above, the screen 3 transmits the projected light entering from the back surface of the screen to the observation side with appropriate diffusion characteristics. As a result, the observer in front of the screen can perceive color images formed on the screen.

These elements are provided inside a cabinet 15. The cabinet 15 is made of a material that does not transmit light and prevents outside light from entering inside the set from portions other than the screen. Therefore, light other than the projected light does not directly enter the screen from the back surface of the screen and pass through the screen to the observation side.

The great feature of the rear projector is that the rear projector is not easily affected by the outside light by providing the elements inside the cabinet 15 in this manner and displaying images as transmitted light. For a front projector that displays images as reflected light, the screen, which is an image displaying portion, basically reflects incident light and is easily affected by the outside light in principle, though there is room for improving its directivity. In other words, the great feature of the rear projector is that it can display clearer images even in a bright environment than the front projector.

It is desirable that the light reaching the eyes of the observer from the screen comprises only a projected image light. If another light is superimposed on the image light, portions that should inherently look dark look bright. The ability of displaying bright portions brightly and dark portions darkly is evaluated by calculating the ratio of the luminance obtained when white signals are input to the luminance obtained when a black display is provided. This ability is called contrast. The contrast is an important factor for showing not only the ability of the projectors but also that of all image display units. Light other than the image light decreases the contrast.

In the rear projector constituted as described above, some factors are considered for the fact that the light other than the image light is observed by the observer.

The first factor is the case where the outside light is directly reflected by the screen. Among the reflected light, the component that is reflected to the observation region is important, and the component that is reflected toward the foot or the ceiling does not decreases the contrast. In the rear projector, which is usually located indoors, the main component of the outside light is considered to be ceiling illumination. Therefore, the regular reflection component goes toward the foot and does not affect the image observation. Thus, the problem is the component that goes toward the observation region by diffuse reflection.

The second factor is the case where the outside light passes through the screen, enters inside the set, is reflected inside the set, passes through the screen again, and exits to the observation side.

The third factor is the case where the projected light is reflected inside the projection lenses and enters a position different from the position where images inherently should be formed, the case where the projected light is reflected by the screen surface, returned inside the set, reflected further by the inner surface of the set, passed through the screen, and exits to the observation side, or the like. In other words, the projected light to form images, produces flare light due to unnecessary multiple reflection inside the elements, irregular refraction, or the like, so that the flare light deviates from the point where the images should be formed and exits from the screen.

The requirements for the screen to prevent the contrast decrease due to these factors are as follows. First, the diffuse reflection of the outside light is reduced. Second, the amount of light entering inside the set is reduced by absorbing a large amount of the incident outside light. Third, among the light entering from the projection side, light other than image light, that is, light entering from directions other than the regular direction, is blocked so as not to be transmitted to the observation side.

According to the rear projector of the present invention using the screen of the first embodiment, most of the outside light entering the screen is absorbed by the light absorption wall columns whose longitudinal direction is arranged in the horizontal direction, so that the diffuse reflection by the screen can be reduced greatly. In addition, the outside light can be prevented from entering inside the set. Furthermore, the light entering from the projection side from directions other than the regular direction can be blocked to prevent the occurrence of double images or the like. Therefore, clear images can be obtained.

The rear projector using the projection device in which images of three primary colors on the CRTs are projected by the three projection lenses and the screen of the first embodiment are described above. However, a high transmission efficiency and an excellent contrast can be obtained similarly by constituting a rear projector using a projection device in which light from the lamp is spatially modulated by the liquid crystal panel and projected by one projection lens and the screen of the first embodiment.

In addition, the screen of the second or third embodiment can be used instead of the screen of the first embodiment in the above-described rear projectors. Especially when the projection device in which light is projected by one projection lens is used, the color shift correction of the screen is unnecessary, and the exit side lenticular lenses are unnecessary. Therefore, the rear projector having a high efficiency for light utilization and an excellent contrast can be realized by using the screen of the second or third embodiment.

EXAMPLES

Example 1

An example of a method for manufacturing the screen in FIG. 1 as described in the first embodiment will be described below.

According to a known technology in which transparent layers and black layers are alternately laminated, solidified, and sliced from the side, a film (a black louver film) 100 having a thickness t=320 μm was formed. In the film 100, transparent portions 102 having a width p=90 μm and a refractive index n=1.5 and light absorption portions (light absorption walls) 101 having a width d=10 μm were alternately formed as shown in FIG. 6.

Figure 6:
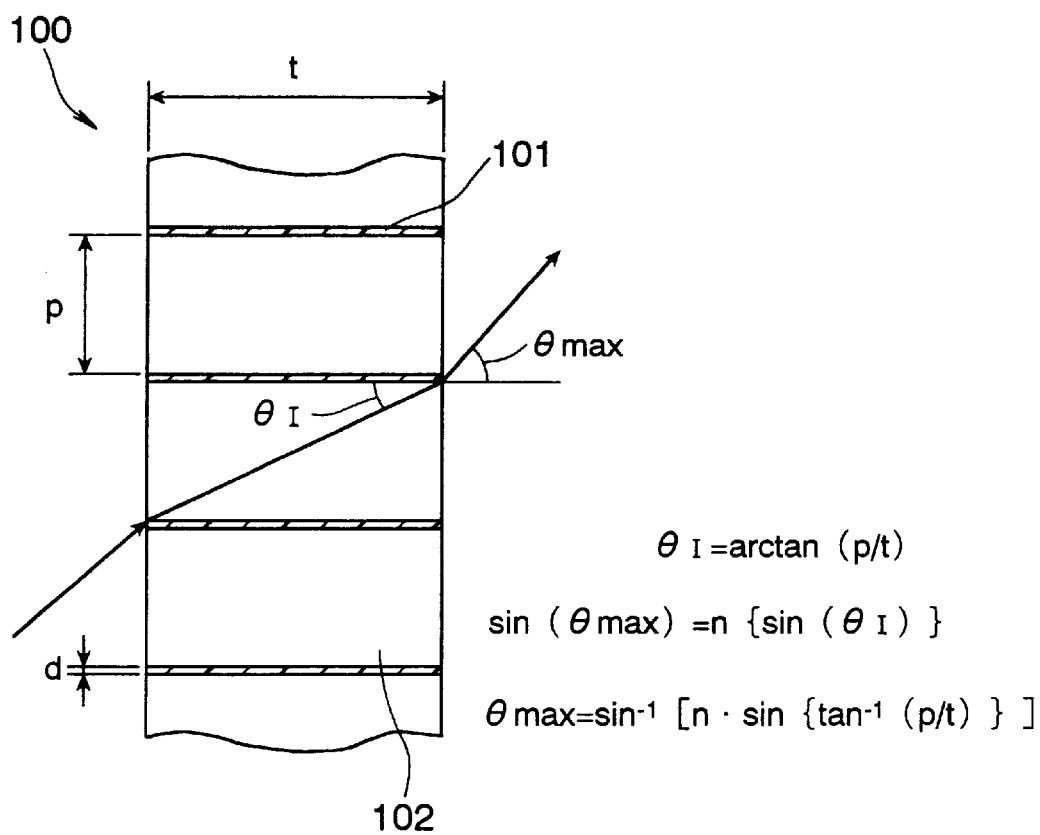
FIG. 6 is a schematic view of a black louver film in Example 1 of the present invention.
Figure 7:
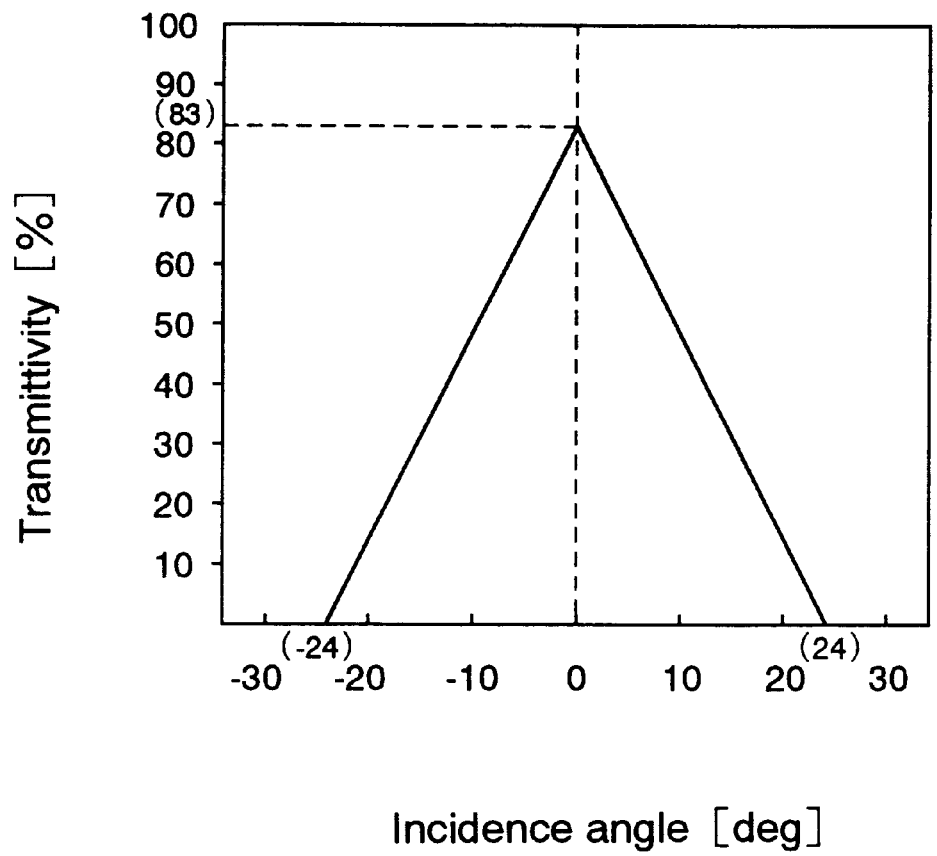
FIG. 7 shows the relationship between the incidence angle and transmittivity of light entering the black louver film in Example 1 of the present invention.
Figure 8:
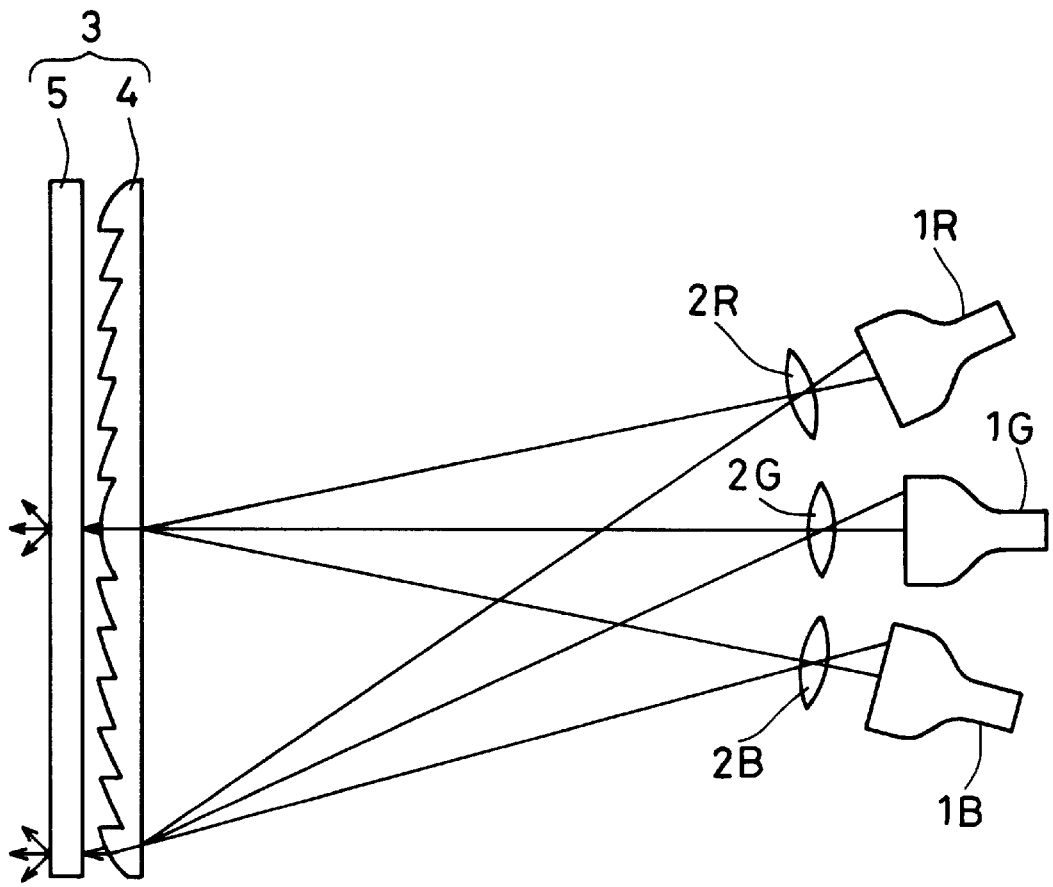
FIG. 8 a schematic view of a basic structure of a conventional rear projector.
Figure 9:
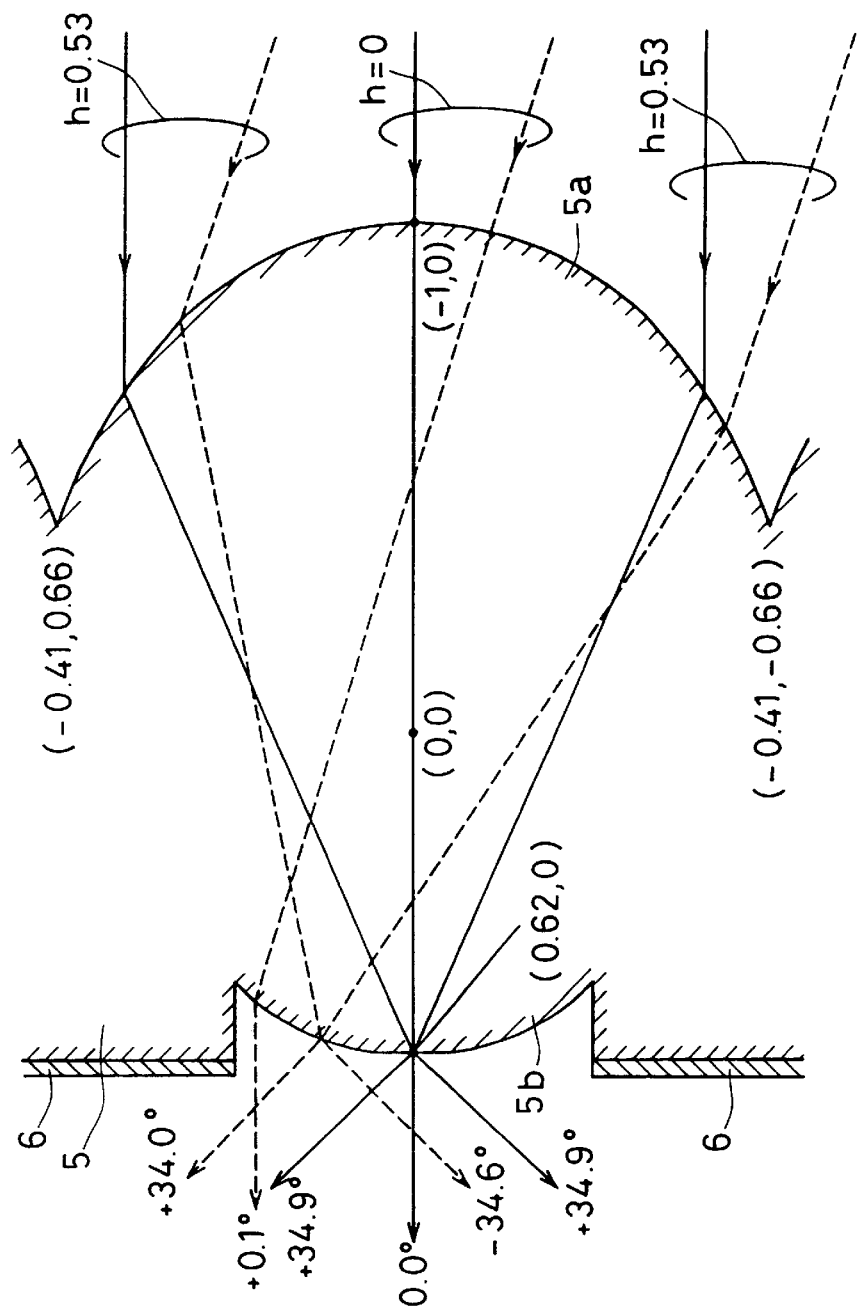
FIG. 9 is a fragmentary sectional view of a lenticular lens sheet, explaining its color shift correction function.

In the black louver film, the maximum angle of transmitted light θ max as shown in FIG. 6 was 24°, and the relationship between the incidence angle and transmittivity of light was as shown in FIG. 7. The transmittivity in the 0° direction parallel to the light absorption wall is 83% because the reflection loss on both surfaces is about 8% and the absorption loss according to the ratio of the width of the light absorption portion to the width of the transparent portion is 10%. The transmittivity is calculated by 0.92×0.90.

A diffusion sheet (a two-layer diffusion sheet) comprising a light diffusion layer having a thickness of 100 μm comprising a substrate of acrylic resin having a refractive index of 1.5 and MS beads having a refractive index of 1.53 and a particle diameter of 6 μm dispersed in the substrate as a light diffusion material, and a transparent layer of acrylic resin having a refractive index of 1.5 and a thickness of 2 mm was formed by a known two-layer extrusion method. The amount of the MS beads added to the light diffusion layer was adjusted so that the half-diffusion angle was 10°. The two-layer diffusion sheet did not contain a light absorption agent, so that the transmission loss was 8%, which was provided only by reflection, and the transmittivity of the two-layer diffusion sheet was about 92%.

The above black louver film and the above two-layer diffusion sheet were laminated with a transparent adhesion material, with the light diffusion layer side of the two-layer diffusion sheet as the bonding surface, to form a diffusion panel (a black louver diffusion panel) having light absorption wall columns.

The transmittivity characteristics obtained when the light enters the black louver diffusion panel from the black louver film side were equal to those in FIG. 7. In addition, the transmittivity of the black louver diffusion panel was not equal to the product of the transmittivity of the black louver film and that of the two-layer diffusion sheet, because the black louver film and the two-layer diffusion sheet were optically bonded with the transparent adhesion material, so that the reflection loss on two surfaces, that is, reflection interfaces with the air, 8%, was eliminated compared with the case where the black louver film and the two-layer diffusion sheet were arranged through an air layer.

A screen was formed as shown in FIG. 1 by using such a black louver diffusion panel.

Projected light is made parallel by the Fresnel lens sheet 4, diffused in the horizontal direction by the lenticular lens array sheet 5, and enters the black louver diffusion panel (the diffusion sheet 7 in FIG. 1), maintaining a very sharp directivity in the vertical direction. The directivity is determined by the projection magnification, that is, the F number of the projection lens. The directivity is within ±3° in a CRT projector and is within ±0.5° in a liquid crystal projector.

As is apparent from the characteristics in FIG. 7, a very small amount of the component is absorbed by the side of the light absorption wall 101 with the above directivity. The transmission loss of the projected light is equal to the sum of an absorption loss of 10% according to the ratio of the width of the light absorption wall 101 to the width of the transparent portion 102 and a reflection loss of about 4% at the interface with the air, so that about 86% of the projected light passes through the black louver portion.

Since the black louver film and the two-layer diffusion sheet are optically bonded with the transparent adhesion material and there is no reflection interface between them, 100% of the projected light passing through the black louver film enters the light diffusion layer of the two-layer diffusion sheet.

The light entering the light diffusion layer is subjected to isotropic diffusion by the light diffusion layer. The diffused light passes through the transparent layer and exits from the surface on the observation side. As a result, the light is diffused in the vertical direction, which is not affected by the action of the lenticular lens, so that the angle of view having a half angle of 10° is obtained. At the same time, the light is diffused into the region that is not affected by the refraction action of the lenticular lens in the horizontal direction, so that smooth characteristics for the angle of view are obtained. The reflection loss occurring when the light exits is 4%, in addition to the above-described losses. Therefore, 80% or more of the projected light entering the black louver diffusion panel is transmitted to the observation side.

The action of the black louver diffusion panel with respect to the projected light is described above. Next, the case where the outside light such as ceiling illumination illuminates the black louver diffusion panel will be considered.

About 4% of the outside light mainly comprising ceiling illumination is reflected by the surface of the black louver diffusion panel on the observation side, which is mirror reflection, and most of the reflected light goes out of the field of view of the observer. The remaining 96% of the outside light entering the two-layer diffusion sheet is diffused by the light diffusion layer and reaches the black louver film. However, most of the component enters at a large angle with respect to the light absorption walls, so that most of the component is absorbed by the light absorption walls before reaching the back surface of the black louver diffusion panel. Furthermore, a very small amount of the component reflected by the back surface is absorbed by the light absorption walls before exiting to the observation side, so that diffuse reflection hardly occurs.

The characteristics of the above structure were compared with those of a structure using a tinted diffusion panel containing a light absorption agent instead of the black louver diffusion panel.

The tinted diffusion panel has a two-layer lamination structure similar to that of the two-layer diffusion sheet used in the black louver diffusion panel. The light diffusion layer of the tinted diffusion panel has the same material, composition ratio, and thickness as the light diffusion layer of the two-layer diffusion sheet used in the black louver diffusion panel. However, a tinted layer comprising a substrate of a transparent acrylic resin and a light absorption agent dispersed inside the substrate is used instead of the transparent layer made only of a transparent acrylic resin.

The diffusion characteristics of the tinted diffusion panel were similar to those of the two-layer diffusion sheet used in the black louver diffusion panel because the light diffusion layer was the same. The half angle was 10°. In addition, a pigment (a light absorption agent) was added so that the light absorption rate was about 30%. As a result, the transmittivity was 64%.

The characteristics obtained when using the same projection device, cabinet, Fresnel lens sheet, and lenticular lens array sheet and exchanging only the diffusion sheet 7 were evaluated. The results are shown in Table 1.

TABLE 1

|  | Black louver diffusion panel | Tinted diffusion panel |
| --- | --- | --- |
| Gain | 3.9 | 3.1 |
| Angle of view in the horizontal direction | 37° | 37° |
| Angle of view in the vertical direction | 10° | 10° |
| Reflection of the outside light | 1.8 nit | 4.2 nit |
| Contrast of the outside light | 131 | 69 |

In Table 1, the gain is a characteristic value defined by {exit luminance [nit]/entrance luminance [lx]}×π·. The angle of view in the horizontal or vertical direction is an angle at which the luminance is ½ of the maximum luminance obtained in the front direction. The reflection of the outside light was obtained by measuring the luminance of the light reflected in the front direction from the center of the screen with the illumination turned on and the power supply of the projector turned off in a laboratory. The illuminance of the illumination with respect to the screen was about 500 luxes. The contrast of the outside light indicates the luminance ratio obtained when the whole white display and the whole black display were provided in the above environment.

In view of the above description, in the example of the present invention using the black louver diffusion panel, bright images are obtained due to a transmission efficiency that is about 25% higher than the transmission efficiency of the conventional structure using the tinted diffusion panel. In addition, an about 90% higher contrast is obtained in the outside light environment by reducing the light of the outside illumination light reflected to the observation direction to ½ or less.

Furthermore, in the conventional structure using the tinted diffusion panel, double images caused by the internal reflection of the Fresnel lens sheet were significantly perceived when observing the bottom portion of the screen at a short distance. In the structure of the present invention using the black louver diffusion panel, double images were not perceived at all, because the component providing the double images entered the black louver diffusion panel at a large angle in the vertical direction and thus was absorbed by the light absorption wall columns.

In addition, in the conventional structure using the tinted diffusion panel, a standing out white portion was observed in the top portion of the screen depending on the positional relationship between the ceiling illumination and the screen. In the structure of the present invention using the black louver diffusion panel, such a phenomenon was not perceived at all. This phenomenon is considered to be caused by the fact that the component regularly reflected by the Fresnel lens surface goes in the direction of the field of view in the portion where the angle formed by the outside light ray and the normal line of the Fresnel lens surface is equal to the angle formed by the horizontal surface and the normal line of the Fresnel lens surface. In the structure of the present invention using the black louver diffusion panel, such a light ray having a large angle with respect to the light absorption wall is completely absorbed by the light absorption wall before reaching the Fresnel lens sheet, so that the above phenomenon does not occur.

In addition, according to the conventional technology in which a light blocking means is located between the lenticular lens array sheet and the Fresnel lens sheet (see Japanese Patent Application (Tokkai Hei) No. 7-56109), a diffusion panel that does not have light absorption wall columns was located on the observation side of the lenticular lens array sheet and a black louver film was inserted between the lenticular lens array sheet and the Fresnel lens sheet. As a result of evaluation, the double images and the local reflection phenomenon caused by the reflection of the Fresnel lens surface as described above were eliminated. However, the luminance of the light reflected in the front direction from the center of the screen was not significantly changed, whether the black louver film was inserted or not. In other words, with the conventional technology in which a light blocking means is located between the lenticular lens sheet and the Fresnel lens sheet, the reflection of the outside light in the direction of the field of view is not reduced and the contrast is not improved in the general outside light environment, because the component of the outside light entering the screen and going in the direction of the field of view by reflection is directed by the diffuse reflection of the diffusion sheet and the lenticular lens array sheet, except for the case where the above-described special positional relationship is present, that is, the illumination light is regularly reflected by the Fresnel lens surface and goes in the direction of the field of view.

In this example, the two-layer diffusion sheet comprising the substrate (the transparent layer) having a large thickness and the relatively thin light diffusion layer was used, and the side of the light diffusion layer was bonded to the black louver film in order to maintain the mechanical strength necessary for installation and minimize the deterioration of the resolving power caused by the fact that the light diffused in the horizontal direction by the lenticular lens is further diffused by the light diffusion layer. However, the present invention is not limited to the use of such a two-layer diffusion sheet. For example, when a one-layer diffusion sheet having a thickness of 2 mm in which a light diffusion material is dispersed throughout the diffusion sheet is similarly bonded to the black louver film, the resolving power deteriorates, while the effect of reducing the reflection of the outside light is similarly obtained, which is the main object of the present invention.

In addition, the width of the transparent portion 102 of the black louver film was 90 μm, and the width and thickness t of the light absorption portion 101 were 10 μm and 320 μm respectively (see FIG. 6) in order to reduce the light loss with respect to the projected light to a relatively small level, absorb a large amount of the outside light, and minimize the moiré problem with the Fresnel lens sheet, the deterioration of the resolving power, and the like, within a precision range attainable by the current manufacturing method. However, this is only an example, and a number of design choices can be considered.

For example, the characteristics as shown in FIG. 7 do not change even if the size of the above example is similarly increased or decreased. If the size of the above example is decreased, the structure is advantageous in respect of resolving power and moiré problem, but the difficulties in manufacturing increases. On the contrary, if the size of the above example is increased, the resolving power deteriorates, and the moiré problem occurs.

If the thickness t of the black louver film is reduced while maintaining the widths (p and d) of the transparent portion and the light absorption portion, θ max increases, and the ability of reducing the amount of the outside light decreases.

On the other hand, the distance between the lenticular lenses and the light diffusion layer decreases, which is advantageous in respect of resolving power. If the thickness t is increased, θ max decreases, and the ability of absorbing the outside light improves, while the resolving power deteriorates. If θ max is set to a very small value, the loss of the projected light is caused by a slight axial difference between the projected light and the louver portion.

Obviously, it is desirable that the loss of the projected light is small as the width d of the light absorption portion is narrower. It is desirable that the width d is minimized as much as the manufacturing permits while maintaining a sufficient light absorption ability.

While in this example, the black louver film was obtained by laminating the transparent layers and the light absorption layers, solidifying them, and slicing them, the black louver film may be formed by another method, for example, generating crazes in a transparent film and causing a coloring agent to permeate the crazes as disclosed in Japanese Patent Application (Tokkai Hei) No. 6-82607. Also, the black louver film may be bonded to the diffusion sheet by applying a transparent adhesive and crossing the black louver film and the diffusion sheet, rather than laminating them with the transparent adhesion material.

Furthermore, the black louver diffusion panel may be manufactured by forming predetermined grooves in a diffusion sheet having a light diffusion layer and filling the grooves with a black material to form light absorption wall columns, or the like, instead of laminating the black louver film and the diffusion sheet as in the above example.

The features of the present invention lie in the structures and functions as described in the following (1) to (4), and any measures can be used as long as these features can be obtained.

(1) The light diffusion layer is located on the observation side of the light absorption wall columns. Due to this, the loss of light is not caused by the diffusion of the projected light by the light diffusion layer.

(2) The light diffusion layer and the light absorption wall columns are optically bonded without an air layer. Due to this, most of the diffused outside light is absorbed before reaching the reflection interface.

(3) The lenticular lens array sheet is located on the projection side of the light absorption wall columns. Due to this, the amount of the outside light entering the lenticular lens array sheet greatly decreases, thereby preventing the contrast decrease caused by the reflection of the outside light.

(4) The lenticular lens is transparent (that is, it does not contain a light diffusion material or a light absorption agent). The longitudinal direction of the lenticular lens is arranged in the vertical direction, and the longitudinal direction of the light absorption wall columns is arranged in the horizontal direction. The lenticular lens diffuses the light only in the horizontal direction while maintaining the directivity in the vertical direction, so that the projected light efficiently passes through the light absorption wall columns without being absorbed by the sides of the light absorption wall columns.

It is obvious that performing a known antireflective treatment on the observation side surface of the black louver diffusion panel prevents the reflection of the light by the surface that is not affected by the absorption action of the light absorption wall columns to eliminate the projection of the reflected light onto the screen and is also effective for improving the quality of image display. The reflection of the outside light by other interfaces is negligible because of the absorption action of the light absorption wall columns. However, performing the antireflective treatment on this surface is expected to improve the transmission efficiency of the projected light.

Example 2

An example of a method for manufacturing the screen in FIG. 3 as described in the third embodiment will be described below.

As in Example 1, according to the known technology in which transparent layers and black layers are alternately laminated, solidified, and sliced from the side, a film (a black louver film) having a thickness t=25 μm was formed. In the black louver film, transparent portions 102 having a width p=90 μm and a refractive index n=1.5 and light absorption portions (light absorption walls) 101 having a width d=10 μm were alternately formed as shown in FIG. 6.

According to a known roll forming method in which a molten resin was extruded into a sheet shape by a die and given a shape by a roll-like mold having the shape of a lenticular lens, a lenticular lens array sheet having a lenticular lens array on one surface, the other surface being flat, was formed. At that time, according to a two-layer extrusion method in which a transparent resin that did not comprise a light diffusion material and a transparent resin in which a light diffusion material was dispersed were separately discharged and laid on each other in a layer shape inside the die, a light diffusion layer was formed as the surface layer on the flat surface side, and a transparent layer was formed as the lenticular lens portion. An acrylic resin having a refractive index of 1.5 was used as the transparent resin, and MS beads having a refractive index of 1.53 and a particle diameter of 6 μm were used as the light diffusion material.

The black louver film was inserted between the roll-like mold and the molten resin in such a manner that the longitudinal direction of the light absorption wall columns was consistent with that of the lenticular lenses so as to provide the shape of the lenticular lens and integrate the molten resin with the black louver film.

The array pitch of the lenticular lenses was 250 μm.

As a result, a lenticular lens array sheet having a cross-section as shown in FIG. 4 was obtained. However, the light absorption wall columns were not completely parallel to the track of the projected light and were substantially parallel to the normal line direction of the lenticular lens surface. Two or three light absorption walls were formed for one lenticular lens.

A Fresnel lens sheet was located on the projection side of the lenticular lens array sheet in which the light absorption wall columns were formed (hereinafter referred to as a black louver lenticular lens sheet) to form a screen as shown in FIG. 3.

With a general shape in which the maximum exit angle according to the refraction action of the lenticular lens is set to about 50°, when light enters from the flat surface side without providing black stripes or light absorption wall columns and without adding a light absorption agent, total reflection is caused by the mechanism shown in FIG. 10, and the reflectance is 30% or more.

In the structure of this example provided with the light absorption wall columns, the total reflection component, which is the dominant factor of the reflected light without the light absorption wall columns, is completely absorbed by the light absorption wall columns. Therefore, the reflectance of the lenticular lens surface is expected to be reduced to 1/15, about 2%.

On the other hand, the projected light made parallel by the Fresnel lens sheet is refracted by the lenticular lens surface. When the light absorption wall columns are formed parallel to this refraction direction, absorption loss does not occur on the side of the light absorption wall, and an absorption loss of 10% occurs depending on the ratio of the width of the transparent portion and the width of the light absorption portion.

In this example, since the light absorption wall columns are formed in the normal line direction of the lenticular lens surface, the light absorption wall columns are not parallel to the projected light except for the one formed in the vertex portion. For example, in a portion at an inclination angle of 60° where the exit angle is about 40°, the projected light has an angle of about 25° with respect to the optical axis, while the angle of the light absorption wall is about 60°. Both cross each other at an angle of 35°.

The height of the light absorption wall (t in FIG. 6) is 25 $\mu$m. Therefore, when the region of the light beam absorbed by the light absorption wall is projected on a surface along the lenticular lens surface, the width of the projected region is about 18 $\mu$m. When this width is projected on a surface perpendicular to the optical axis, the projected width is 9 $\mu$m. Light rays passing through this region having a width of 9 $\mu$m are absorbed by the side of the light absorption wall and lost.

As a result of this absorption loss on the side of the light absorption wall and the absorption loss of 10% as described above, an absorption loss of about 16% occurs on average.

Summarizing the above, the effect of reducing the reflection to 1/15 is obtained at the absorption loss of 16%. With a general method in which a light absorption agent is dispersed throughout the inside of the lenticular lens array sheet, the reflection reduction effect expected to be obtained at the same absorption loss as described above is about 3/10 (about 30%). That is, according to the structure of the present invention, it is possible to reduce the reflection of the outside light to 1/4.5 at the same transmission efficiency compared with the general structure in which the light absorption agent is dispersed.

With another conventional technology in which a black louver film is inserted between the lenticular lens array sheet and the Fresnel lens sheet as a blocking means, it is obvious that the blocking means is not effective for reducing the reflection in the lenticular lens portion.

While the lenticular lens array sheet was formed by extrusion and roll forming and integrated with the black louver film simultaneously in this example, it is possible to integrate a lenticular lens array sheet and a black louver film, which are separately formed, by hot pressing, a known technology.

While the array pitch of the light absorption wall columns of the black louver film was 100 $\mu$m and the array pitch of the lenticular lenses was 250 $\mu$m in this example, both pitches can be changed to other values. However, if the ratio of both pitches, that is, the array pitch of the light absorption wall columns/the array pitch of the lenticular lenses, is set to 1/a half integer (that is, 1/1.5, 1/2.5, 1/3.5 . . .), the pitch of moiré formed by the lenticular lenses and the light absorption wall columns is minimized, so that moiré is not easily caused.

In this example, the light absorption wall columns were formed in the normal line direction of the lenticular lens surface and was not completely parallel to the light ray paths of the projected light, so that light absorption loss occurs. However, a black louver lenticular lens sheet that has the light absorption wall columns parallel to the light ray paths of the projected light can be manufactured by forming a lenticular lens array sheet, forming grooves to be parallel to the light ray paths by machining, and filling the grooves with a light absorption material.

The invention may be embodied in other forms without departing from the spirit or essential characteristics thereof.

The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A rear projection screen comprising in the following order from a projection side:

a Fresnel lens sheet;

a lenticular lens array sheet whose longitudinal direction is arranged in a vertical direction; and a light diffusion sheet having a flat entrance surface, wherein the light diffusion sheet has louver-shaped light absorption wall columns whose longitudinal direction is arranged in a horizontal direction and a light diffusion layer, the louver-shaped light absorption wall columns are formed so as to have a side surface arranged perpendicular to a surface of the screen, and the light diffusion layer is located on an observation side of the light absorption wall columns.

2. A rear projection screen comprising in the following order from a projection side:

a Fresnel lens sheet; and a lenticular lens array sheet having a lenticular lens array whose longitudinal direction is arranged in a vertical direction on a projection side wherein the lenticular lens array sheet has louver-shaped light absorption wall columns whose longitudinal direction is arranged in a horizontal direction and a light diffusion layer, and the light diffusion layer is located on an observation side of the light absorption wall columns.

3. A rear projector comprising a rear projection screen, in which the rear projection screen comprises in the following order from a projection side:

a Fresnel lens sheet;

a lenticular lens array sheet whose longitudinal direction is arranged in a vertical direction; and a light diffusion sheet having a flat entrance surface, wherein the light diffusion sheet has louver-shaped light absorption wall columns whose longitudinal direction is arranged in a horizontal direction and a light diffusion layer, the louver-shaped light absorption wall columns are formed so as to have a side surface arranged perpendicular to a surface of the screen, and the light diffusion layer is located on an observation side of the light absorption wall columns.

4. A rear projector comprising a rear projection screen, in which the rear projection screen comprises in the following order from a projection side:

a Fresnel lens sheet; and a lenticular lens array sheet having a lenticular lens array whose longitudinal direction is arranged in a vertical direction on a projection side, wherein the lenticular lens array sheet has louver-shaped light absorption wall columns whose longitudinal direction is arranged in a horizontal direction and a light diffusion layer, and the light diffusion layer is located on an observation side of the light absorption wall columns.

* * * * *